Figure 1:
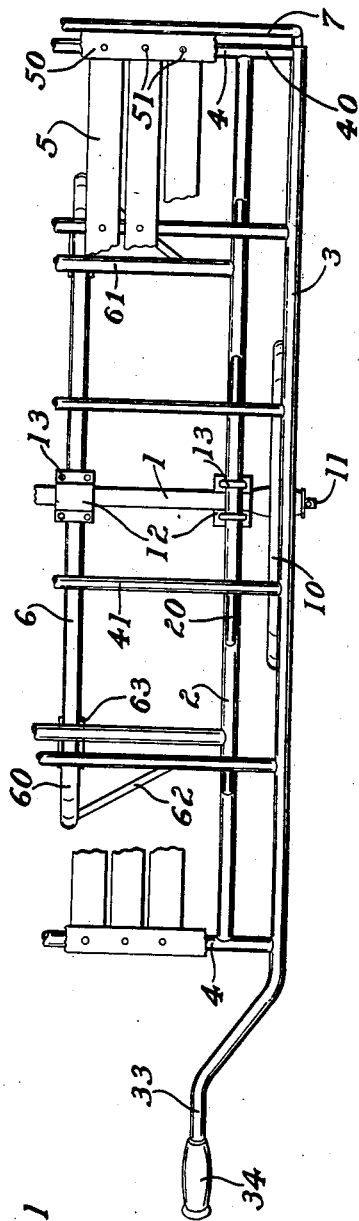

Jan. 30, 1940.　　　　　J. ROBINSON　　　　2,188,578
LUGGAGE CART
Filed Aug. 13, 1938　　　2 Sheets-Sheet 1

Inventor
John Robinson
By
Charles L. Reynolds
Attorney

Jan. 30, 1940.    J. ROBINSON    2,188,578
LUGGAGE CART
Filed Aug. 13, 1938    2 Sheets-Sheet 2

Inventor
John Robinson
By
Charles L. Reynolds
Attorney

Patented Jan. 30, 1940

2,188,578

UNITED STATES PATENT OFFICE 2,188,578

LUGGAGE CART

John Robinson, Seattle, Wash.

Application August 13, 1938, Serial No. 224,808

8 Claims. (Cl. 280—53)

My invention relates to luggage carts such as are employed at terminals for the handling of travelers' hand luggage. It may, of course, be used in industrial plants for the handling of various articles, and for other purposes, but it has been primarily designed to enable a single porter or "red cap" to transport numerous pieces of hand luggage from the foyer of a station to the train platform, and vice versa, and will be practically described in connection with that use.

Heretofore carts for such purposes have been of heavy construction, an outgrowth of baggage trucks for transporting trunks and the like. While ramps are provided for the accommodation of porters handling such carts, nevertheless, because of the weight and awkwardness of such trucks, it requires considerable exertion for a porter to move a cart laden with numerous pieces of baggage from point to point within a terminal, even on a level, and especially if it has to be transported from one level to another. It is a particular object of this invention to devise such a cart which in itself shall be light, but which is sufficiently strong and rugged to support as much luggage as may be conveniently handled and cared for by a single porter, and which will stand up for long periods of time under this type of service.

More specifically it is an object to provide a cart of this type which is made up of a minimum of elements, preferably tubular in character, for lightness; rigidity connected together as by welding; and including truss-like elements which afford maximum strength with minimum weight; all so assembled that the porter may conveniently load it, may conveniently transport it from place to place, and will have a minimum of interference with his freedom of stride, minimum likelihood of striking against objects such as curbs, or of running his wheels into persons, posts, or upstanding objects in his path, any of which would tend to impede his progress; which will permit him to stand the cart approximately level on fixed legs or runners, so arranged that they are not likely to block the progress of the cart should an obstruction be encountered, or will skid along the ground, if the load overbalances the cart, without materially impeding its progress or likelihood of breaking off the runner; and in general which is ruggedly built to withstand the shock of loading it repeatedly with pieces of hand luggage which may weigh in the neighborhood of fifty pounds, or over.

With these and other objects in mind, as will appear hereafter, my invention comprises the novel cart, and the novel structural principles thereof, as shown in the accompanying drawings, described in this specification, and as will be more particularly defined by the claims which terminate the same.

In the accompanying drawings I have shown my invention embodied in a cart such as is now preferred by me, it being understood that various changes may be made in the details, form, and arrangement of parts without departing from the spirit of my invention as defined in the claims.

Figure 2:
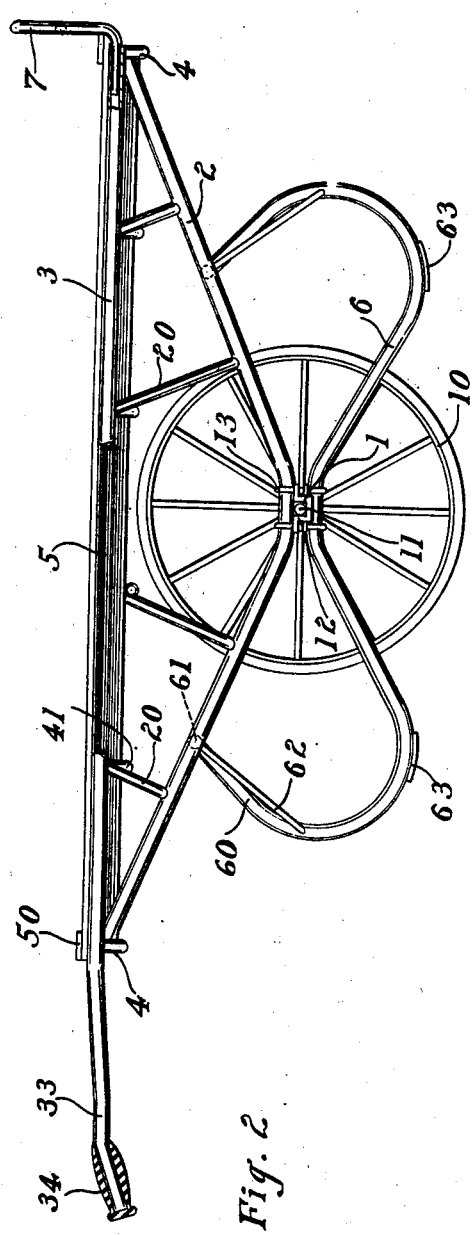
Figure 3:
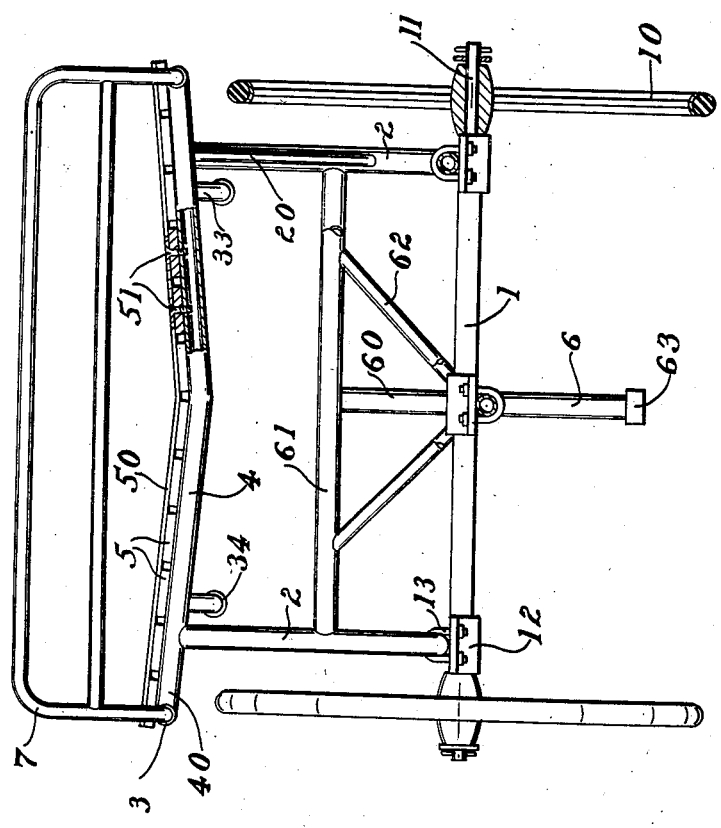

Figure 1 is a half plan view, Figure 2 is a side elevation, and Figure 3 is an end view, each with parts broken away or shown in section, illustrating the preferred construction of my cart.

The cart is a two-wheel cart, the wheels 10 being mounted upon the cylindrical ends 11 of an axle 1, which extends transversely of the cart between its ends, preferably at about its middle. The luggage-supporting deck thus extends an equal distance forwardly and rearwardly, for proper balancing of the load. The axle 1 is preferably square, and only the extensions 11 at the ends are cylindrical for the rotative bearing of the wheels 10. Any suitable type of bearing may be employed.

Extending from the axle upwardly, both forwardly and rearwardly, and at each side of the cart, are structural members 2, which are preferably tubular. Joined to the upper ends of these tubular members 2 are longitudinal structural members 3, preferably also tubular. The tubes 2 and 3 may be directly joined at their ends, or, in the form shown, they are joined through the intermediary of transverse tubular elements 4, which are rigidly joined to the ends of the inclined tubes 2, and which connect the spaced tubes 2 at opposite sides of the cart, these transverse elements 4 having extensions 40 outwardly of or to the outside of the tubes 2, the ends of these extensions 40 being rigidly joined to and connected by the longitudinal tubes 3. Thus the tubes 3 overhang the wheels 10 and protect the latter, acting as side fenders, and afford proper width to the cart as a whole.

The tubes 2 and 3, thus joined, constitute a triangular truss at each side of the cart, and this truss may be strengthened, if need be, by compression struts 20 which connect the tubes 4, between their ends and the axle, to the tubes 3, either directly or through the intermediary of additional intermediate transverse tubes 41, which join the tubes 3 at opposite sides of the cart, and to which, in the structure shown, the compression struts 20 are rigidly joined.

The transverse tubes 4, 40 and 41, with the longitudinal tubes 3, constitute a deck-supporting structure, which may be slightly inclined downwardly from each side toward the longitudinal axis of the cart, but which is in general horizontal, and upon this structure, supported by the triangular trusses before mentioned from the axle, a deck is supported. The deck may consist of planks 5 of wood or other suitable material, bound with metal edge straps 50, and secured to the deck-supporting structure by screws or rivets or the like, shown at 51.

The truss structure is rigidly fixed to the square axle 1 by suitable means, to rest directly upon the axle. This may be accomplished by partly encircling the axle with a channeled clip 12, and by encircling the tube 2 at its lowest point with U-bolts 13, received in and secured to the brackets 12.

To support the cart when it is standing, I provide feet consisting of a tube 6, which extends beneath the axle and thence downwardly, both forwardly and rearwardly, towards but not to the ground level, and which is then curved back upwardly, and preferably somewhat towards the center of the cart, as indicated at 60. Preferably a single tube only is employed, and this is located intermediate the tubes 2; it may be connected to the axle by a similar bracket and U-bolt arrangement. The ends 60 are connected to the truss structure, preferably by means of transverse tubes 61 extending between intermediate portions of the tubes 2, at front and rear, to which the ends 60 of the tube 6 are rigidly joined, and preferably sway bracing elements 62 also join the tube 6 with the transverse tube 61. A wear plate 63 is provided, of hard metal, since the tubes may be of comparatively soft aluminum alloy, for lightness. These wear plates or shoes 63 are positioned where they will contact the ground when the cart is standing, supported on one or the other of its feet. These shoes also act as skids, should they contact the platform, while the cart is being moved, and do not materially impede the progress of the cart when this happens. Since the tube 6 and extensions 60 lie in a longitudinal plane and are curved, the stress in such event is well resisted, and there is little likelihood of breaking a leg.

The cart may also be provided with an upstanding end, as indicated at 7, preferably also of tubular construction, with its ends received within and rigidly connected to the ends of the longitudinal tubes 3. I prefer also that the opposite or rear ends of these tubes 3 be extended and if necessary directed inwardly, as shown at 33, to form handles by which a porter may push the cart forwardly, or pull it. Hand grips 34 of rubber composition or similar material may be applied to the ends of the handles 33.

As indicated above, it is preferred that the tubular elements be of aluminum alloy, such as duralumin, whereby they are made light yet strong. The structure is the lightest consistent with adequate strength and ruggedness, and while tubular elements are not essential, it is preferred that the structural elements be of tubular form. Being constructed of an aluminum alloy (or indeed, if made of other metals), they may be welded together, so that the entire structure is rigidly and permanently joined. The joining of the elements otherwise than by welding is not outside the scope of my invention.

The deck is or may be of ample size to accommodate as much luggage as it is convenient to transport in this manner. Its shape need not be rectangular as shown, for its ends, or at least its forward end, or its sides, may be curved in plan view, the use of tubing lending itself admirably to such design changes. The weight of the luggage on the deck 5 is transferred by the structural elements to the two trusses, consisting of the joined tubes 2 and 3, and thence directly to the axle. The two trusses are cross-braced, by the tubes 4, 41, and 61, and through the axle, so that it is rigid as a whole transversely. The porter pushing at the handles 33 is afforded ample freedom of stride, for the foot-forming portions of the tube 6 are in the longitudinal center line of the cart, and consequently are straddled by the porter's feet as he strides along, and there is nothing to impede his stride.

What I claim as my invention is:

1. A luggage cart comprising a transverse axle and wheels thereon, two continuous tubes spaced apart and mounted inside the wheels upon the axle, inclined upwardly therefrom both forwardly and rearwardly to points above the top of the wheels, transverse tubes joining the inclined tubes at front and rear, and projecting outwardly therefrom to the planes of the wheels, longitudinal tubes rigidly joined at each side to the ends of the transverse tubes, and lying above and in the general plane of the wheels and a luggage-supporting deck supported from the structures thus formed.

2. A luggage cart comprising a transverse axle and wheels thereon, two tubes spaced apart and mounted upon the axle, inclined upwardly therefrom both forwardly and rearwardly, transverse tubes rigidly joining the forward and rear ends of the two inclined tubes, a longitudinal tube at each side rigidly joined to the ends of the transverse tubes, outwardly of the connection of the latter to the inclined tubes, intermediate transverse tubes joining the two longitudinal tubes, compression struts spaced along the inclined tubes and joining the same to intermediate transverse tubes thereabove, and a luggage-supporting deck supported on the structure thus formed.

3. A luggage cart comprising a transverse axle and wheels thereon, two tubes spaced apart and fixedly mounted inside the wheels upon the axle, and inclined upwardly therefrom both forwardly and rearwardly, transverse tubes rigidly joining the forward and rear ends of the two inclined tubes, and extending outwardly thereof at each side, a longitudinal tube rigidly joining the outwardly extended ends of the transverse tubes, and extending above and somewhat outwardly beyond the wheels at each side, intermediate transverse tubes rigidly joining the two longitudinal tubes between their ends, compression struts joining intermediate tubes, inwardly of their ends, with intermediate portions of the inclined tubes, and a luggage-supporting deck supported on the transverse and longitudinal tubes.

4. A luggage cart comprising a transverse axle and wheels thereon, two continuous tubes spaced apart and mounted upon the axle, inclined upwardly therefrom both forwardly and rearwardly, longitudinal tubes rigidly joined at each side to the ends of the inclined tubes, to constitute therewith two trussed structures, transverse elements rigidly joining the two trussed structures, a luggage-supporting deck supported from the trussed structures, a transverse tube rigidly connecting the inclined tubes, inwardly of each of their ends, and a supporting leg rigidly connected to and depending from each such transverse tube, intermediate the ends of the latter.

5. A luggage cart comprising a transverse axle and wheels thereon, two tubes spaced apart and fixedly mounted upon the axle, and extending upwardly therefrom both forwardly and rearwardly, a luggage-supporting deck disposed above the axle, a deck-supporting structure rigidly joined to the upper ends of the tubes, a transverse tube rigidly connecting the inclined tubes, inwardly of their ends, and a single tube disposed intermediate the inclined tubes, and extending downwardly from the axle both forwardly and rearwardly towards but not to the ground level, when the deck is approximately level, and then upwardly, and rigidly joined and sway-braced to the transverse tubes, to form supporting legs for the cart.

6. A luggage cart comprising a transverse axle and wheels thereon, two tubes spaced apart and mounted upon the axle, inclined upwardly therefrom both forwardly and rearwardly, transverse tubes rigidly joining the forward and rear ends of the two inclined tubes, a longitudinal tube at each side rigidly joined to the ends of the transverse tubes, outwardly of the connection of the latter to the inclined tubes, intermediate transverse tubes joining the two longitudinal tubes, and a luggage-supporting deck supported on the structure thus formed.

7. A luggage cart comprising a transverse axle and wheels thereon, two tubes mounted upon and each similarly inclined upwardly from the axle both forwardly and rearwardly, disposed one at each end of the axle, a deck structure carried by the ends of the two tubes, spaced above the axle, said deck structure including longitudinal elements operatively joined to the ends of the tubes, to resist spreading of the tubes' ends, and transverse elements joined to the longitudinal elements to support a load, and a continuous tube extending from the axle downwardly, both forwardly and rearwardly, almost to the floor level, and then upwardly, its ends being rigidly connected to the first-mentioned tubes, to constitute supporting legs.

8. A luggage cart comprising a transverse axle and wheels thereon, a tube secured to the axle, intermediate the latter's ends, and extending downwardly both forwardly and rearwardly nearly to the floor level, and then upwardly, two tubes secured to the axle at opposite sides of and spaced from the first tube, and extending upwardly both forwardly and rearwardly, deck structure rigidly joined to and spacing apart the upper ends of the last mentioned tubes, and constituting a truss chord for each thereof, and lateral sway-bracing and load-supporting means rigidly connecting the upper ends of all three tubes, and constituting the central tube a leg.

JOHN ROBINSON.